(12) United States Patent
Pancik et al.

(10) Patent No.: US 10,419,643 B2
(45) Date of Patent: Sep. 17, 2019

(54) SYSTEMS AND METHODS FOR CREATING COLOUR SEPARATIONS FOR USE IN MULTI-STAGE PRINTING PROCESSES TO PRODUCE AN ACCEPTABLE FACSIMILE OF A USER-SELECTED COLOUR ARTWORK ON A SUBSTRATE

(71) Applicant: Represent Holdings, LLC, Los Angeles, CA (US)

(72) Inventors: Andrej Pancik, Slovenska Lupca (SK); Simon Sotak, Prague (CZ)

(73) Assignee: Represent Holding, LLC, Los Angeles, CA (US)

( * ) Notice: Subject to any disclaimer, the term of this patent is extended or adjusted under 35 U.S.C. 154(b) by 0 days.

(21) Appl. No.: 15/661,839

(22) Filed: Jul. 27, 2017

(65) Prior Publication Data

US 2018/0035016 A1    Feb. 1, 2018

Related U.S. Application Data

(60) Provisional application No. 62/368,482, filed on Jul. 29, 2016.

(51) Int. Cl.
*H04N 1/54*    (2006.01)
*G06F 3/12*    (2006.01)
(Continued)

(52) U.S. Cl.
CPC .......... *H04N 1/54* (2013.01); *G06F 3/1204* (2013.01); *G06F 3/1208* (2013.01);
(Continued)

(58) Field of Classification Search
None
See application file for complete search history.

(56) References Cited

U.S. PATENT DOCUMENTS

| 5,416,848 A | 5/1995 | Young |
| 2003/0117653 A1 | 6/2003 | Velde et al. |

(Continued)

FOREIGN PATENT DOCUMENTS

| EP | 2187616 | 5/2010 |

OTHER PUBLICATIONS

International Search Report and Written Opinion regarding PCT Patent App. No. PCT/US17/44318 dated Oct. 5, 2017.

(Continued)

*Primary Examiner* — Barbara D Reinier
(74) *Attorney, Agent, or Firm* — Dunlap Codding, P.C.

(57) ABSTRACT

Systems and methods of efficiently creating color separations for subsequent use in multi-stage printing processes to produce an acceptable facsimile of user-selected artwork on a substrate are disclosed. The method obtains an initial color palette ((i.e. an ordered list of a plurality of printing inks) from an electronic rendering and extracts a final color palette from the initial color palette by clustering the plurality of unique color values corresponding to the plurality of printing inks in the initial color palette into discrete color clusters. The method finds a centroid for each discrete color cluster, creates a reduced color set containing a plurality of color values within the particularly-defined color space, each color value in the reduced color set corresponding to the color value representative of each found centroid, orders the plurality of color values in the reduced color set to form the final color palette as an ordered list of a plurality of printing inks, and then produces color separation plates based on the electronic rendering and final color palette.

9 Claims, 9 Drawing Sheets

(51) Int. Cl.
*H04N 1/00* (2006.01)
*H04N 1/60* (2006.01)
*H04N 1/56* (2006.01)
*H04N 1/64* (2006.01)
*G06Q 30/06* (2012.01)

(52) U.S. Cl.
CPC .......... *G06F 3/1219* (2013.01); *G06F 3/1229* (2013.01); *G06F 3/1256* (2013.01); *H04N 1/0044* (2013.01); *H04N 1/00344* (2013.01); *H04N 1/00954* (2013.01); *H04N 1/56* (2013.01); *H04N 1/6008* (2013.01); *H04N 1/6016* (2013.01); *H04N 1/6058* (2013.01); *H04N 1/644* (2013.01); *G06Q 30/0635* (2013.01)

(56) References Cited

U.S. PATENT DOCUMENTS

| | | |
|---|---|---|
| 2004/0223172 A1 | 11/2004 | Yoshizawa et al. |
| 2010/0124372 A1 | 5/2010 | Parr |
| 2010/0195162 A1 | 8/2010 | Majewicz |
| 2010/0214576 A1 | 8/2010 | Morovic et al. |
| 2011/0216120 A1 | 9/2011 | Friedman et al. |
| 2012/0092359 A1 | 4/2012 | O'Brien-Strain et al. |
| 2012/0200897 A1* | 8/2012 | Mestha ............... H04N 1/6033 358/3.27 |
| 2013/0154516 A1 | 6/2013 | Hatley et al. |
| 2015/0070730 A1* | 3/2015 | Harvill ............... H04N 1/54 358/3.03 |
| 2016/0080608 A1 | 3/2016 | Morovic et al. |
| 2018/0034998 A1* | 2/2018 | Pancik ............... H04N 1/6058 |

OTHER PUBLICATIONS

International Search Report and Written Opinion regarding PCT Patent App. No. PCT/US17/44385 dated Oct. 19, 2017.

Notice of Allowance and Fee Due for U.S. Appl. No. 15/662,037, dated Jul. 18, 2018.

* cited by examiner

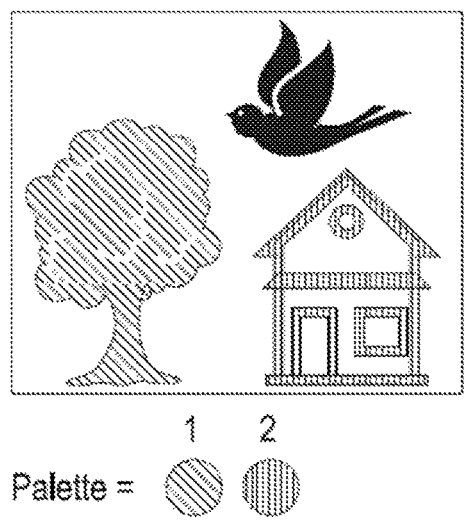
FIG. 7
Prior Art
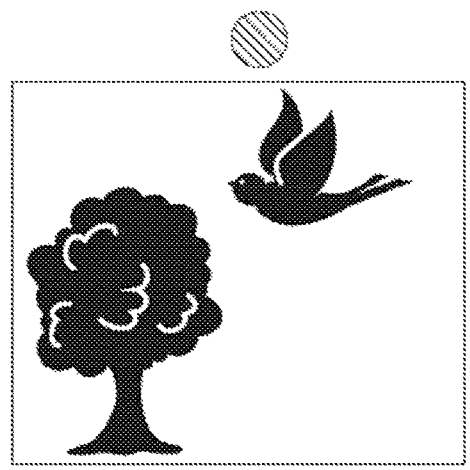 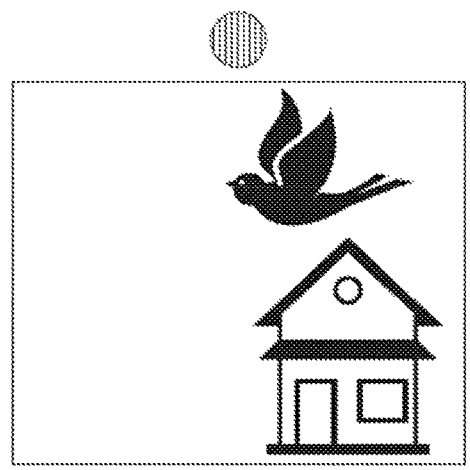
FIG. 8
Prior Art
FIG. 9
Prior Art

SYSTEMS AND METHODS FOR CREATING COLOUR SEPARATIONS FOR USE IN MULTI-STAGE PRINTING PROCESSES TO PRODUCE AN ACCEPTABLE FACSIMILE OF A USER-SELECTED COLOUR ARTWORK ON A SUBSTRATE

INCORPORATION BY REFERENCE TO RELATED APPLICATIONS

The present patent application incorporates by reference the entire provisional patent application identified by U.S. Ser. No. 62/368,482, filed on Jul. 29, 2016, and claims priority thereto under 35 U.S.C. 119(e).

FIELD OF INVENTION

The present invention relates generally to a computer system for image processing techniques used in pre-production for screen printing of apparel and other items. More specifically, the present invention relates to automated technique for producing colour separations and using those colour separations in screen and/or other types of printing.

BACKGROUND OF THE INVENTION

In the field of custom printing of clothing, apparel or other objects, there are two prominent techniques of applying a print: digital printing and screen printing. The former typically requires less image processing and produces higher-quality prints, but is generally slower and more expensive in runs with many units. Screen printing is therefore the preferred option for high-volume production, especially when used to print non-photo-realistic images.

In screen printing, different colour printing inks are applied to a product substrate one at a time, in layers. This technique is illustrated using a two-colour palette of green and red in FIGS. 7, 8, and 9. FIG. 7 illustrates a resulting print of an image comprised of a tree printed completely in green, a house printed completely in red, and a bird printed by applying a combination of both red and green inks. FIG. 8 depicts the content of the separation plate used to apply green coloured ink for the example composite print of FIG. 7. FIG. 9 depicts the content of the separation plate used to apply red coloured ink to the substrate in the example composite print of FIG. 7. As shown in FIGS. 8 and 9, each colour plate is a black-and-white, grayscale image that defines where the corresponding ink (i.e. green or red, in our illustration) shall be applied onto the substrate and in what relative amount. This set of black-and-white images (often referred to as "plates"), together with their order of application to the product substrate are called a colour separation.

The number of inks that can be used in one screen-printing job is fairly limited, with the maximum typically ranging from 6 to 20 colours. This limitation comes from the historical economics of setup and the technical limitations of the machines used for the production.

Thus, traditional screen printing requires non-trivial pre-processing of the printed graphics that consists of selecting the inks that will be used to print the image and separating the image into layers, one for each ink. This pre-processing step is traditionally done by graphics professionals, requiring up to tens of hours of labor to produce acceptable colour separations to produce complex graphics. Even when this pre-processing step is performed with care, the output quality varies greatly, as the process leaves a non-negligible margin for error.

There are several common colour separation methods. These include, but are not limited to, index colour, spot colour, process colour and simulated process colour separations. Some of these methods can be used only on specific types of artwork; and some change the look of certain artwork more than others.

Process colour separations, for instance, use a CMYK approach that is typical for printing on paper. It uses four primary colours: cyan (C), magenta (M), yellow (Y), and black (K). This method, however, produces prints with a limited colour gamut, especially when used in association with dark fabrics.

When printing a more complex image (such as a photo), choosing a good palette becomes a difficult task. Generally, the more colours used in producing an image, the better the result. This improved result has traditionally come at a higher than desirable cost, for each colour used a separate costs is incurred, as more ink has to be prepared and additional screens need to be produced for the printing job.

Thus, it would be useful for the printing industry to have a system and method for quickly creating colour separations that together produce acceptable colour replication of an image for use in multi-stage printing processes. It would be additionally useful for the industry to have a system and method for simulating the results of a colour separation to facilitate an ability to evaluate a proposed colour separation without having to spend money on a bad design.

SUMMARY OF THE DISCLOSURE

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The present disclosure relates to a method of efficiently creating colour separations for subsequent use in multi-stage printing processes to produce an acceptable facsimile of user-selected artwork on a substrate, wherein each pixel of the user-selected artwork has a pixel colour value. The method comprises receiving, on a processor, an electronic rendering of the user-selected artwork, the electronic rendering having a plurality of pixels wherein each of the plurality of pixels has a colour value within a particularly-defined colour space and contains a plurality of unique colour values. The method obtains an initial colour palette from the electronic rendering using the processor, wherein the initial colour palette is an ordered list of a plurality of printing inks, each of the plurality of printing inks in the initial colour palette corresponding to a respective one of the plurality of unique colour values in the electronic rendering of the user-selected artwork. The method then extracts a final colour palette from the initial colour palette using the processor by (1) clustering the plurality of unique colour values corresponding to the plurality of printing inks in the initial colour palette into discrete colour clusters, wherein the resulting number of discrete colour clusters is less than or equal to the plurality of unique colour values, (2) finding a centroid for each discrete colour cluster formed by clustering, creating a reduced colour set containing a plurality of colour values within the particularly-defined colour space, each colour value in the reduced colour set corresponding to the colour value for each centroid found, and (3) ordering the plurality of colour values in the reduced colour set to form the final colour palette as an ordered list of a plurality of printing inks.

The method then uses the processor to create digital representations of colour separation plates for each of the plurality of printing inks in the final palette.

The clustering of the plurality of unique colour values corresponding to the plurality of printing inks in the initial colour palette may be implemented using one of the following techniques: (a) non single-linkage, hierarchical agglomerative clustering (HAC); (b) k-means clustering; (c) fuzzy C-means clustering; (d) spectral clustering; (e) Ward hierarchical clustering; (f) Expectation-maximization (EM) clustering; (g) BIRCH algorithm clustering; (h) median cut; and (i) any combinations of the foregoing.

The disclosed method may further involve calculating the colour values within the colour space for one or more composite colours by linear combination of the colour values of one or more selected ones of the plurality of printing inks in the final colour palette, weighted by an amount of that respective printing ink expected in a particular composite colour to be formed by the colour separation plates created based upon the final palette. One or more of the calculated composite colours may be displayed to a user on an output device to facilitate the user determining whether each of the calculated composite colours are an acceptable facsimile. Where the one or more calculated composite colours are displayed the method may further comprise:

(1) receiving an indication that at least one of the calculated composite colours is unacceptable;
(2) extracting a first alternative final colour palette using the processor with a first different clustering technique; and
(3) using the first alternative final colour palette as the final colour palette.

In some approaches, the disclosed method may further comprise extracting a second alternative final colour palette using a second clustering technique; and receiving an indication from the user whether to use the first or second alternative final colour palette as the final colour palette.

Where only certain printing inks may be available for use in printing, the method may further comprise finding colour values within the particularly-defined colour space for each of the available printing inks and then determining, for each discrete colour cluster centroid found by the processor, the shortest distance between the colour value of that centroid and the colour values of the available printing inks to find the closest available printing ink, and then resetting the colour value of the centroid to the colour value of the closest available printing ink.

The disclosed methods may further compare one of the calculated composite colours with a respective one of the pixel colour values from the user-selected artwork. If the resulting comparison does not reflect an acceptable facsimile, then the method may adjust the weighting and/or the colour value of at least one (and perhaps ultimately each) of the plurality of printing inks included in the calculated composite colour. Once the weighting and/or colour value of at least one printing ink is changed, the method recalculates the colour value of that calculated composite colours and repeats the process of comparing the calculated composite colour with the respective one of the pixel colour values from the user-selected artwork using the recalculated colour value. If the resulting comparison now reflects an acceptable facsimile, then the weighting and colour values of the one or more selected ones of the plurality of printing inks results in the one of the calculated composite colours being favorably compared, then those colour values are properly in the final palette. These calculations and comparison may further require normalizing colour values into the same particularly defined colour space.

Where only certain printing inks are available for use, finding the centroid for each discrete colour cluster in the method may further require finding colour values within the particularly-defined colour space for each of the available printing inks; determining, for each discrete colour cluster centroid found, the shortest distance between the colour value of that centroid and the colour values of the available printing inks to find the closest available printing ink, and then reset the colour value of the centroid to the colour value of the closest available printing ink.

When the final colour palette is extracted, the method may involve setting a desired size for the final palette to an integer, N. If the method determines that the reduced colour set contains more colour values than the desired size of the final palette (i.e. N), then the method may (a) randomly select N colour values from the reduced colour set to be initial cluster centroids within the colour space, (b) assigning each remaining colour value in the reduced colour set to a colour cluster having the nearest initial cluster centroid within the colour space, and then (c) for each of the initial cluster centroids, recalculating the colour value of the initial cluster centroid based on all of the colour values assigned to that colour cluster resulting in a recalculated initial cluster centroid for each colour cluster. Then, the method would set a change index, R, to zero, and for each colour value in the reduced colour set finding the recalculated initial cluster centroid that is the closest to that colour value and if that colour value is not already assigned to its closest colour cluster, recalculating initial cluster centroid, reassigning the colour value to the closest colour cluster, and incrementing R, the change index. After all the colour values in the reduced colour set have been subjected to the recalculation, if the change index, R, is still equal to zero, then the method outputs the recalculated initial cluster centroids as the final colour palette. Otherwise (i.e. the change index is greater than zero), then the method recalculates the colour value of each recalculated initial cluster centroid based on the colour values currently assigned to the colour cluster, resets the change index, R, to zero, and retests each colour value in the reduced colour set until the change index remains zero.

The disclosure further includes a system for efficiently creating colour separations for subsequent use in multi-stage printing processes to produce an acceptable facsimile of user-selected artwork on a substrate. The system comprises a processor that receives an electronic rendering of the user-selected artwork, the electronic rendering having a plurality of pixels wherein each of the plurality of pixels has a colour value within a particularly-defined colour space and contains a plurality of unique colour values. The processor is configured to process the electronic rendering in accordance with program logic contained in memory that comprises part of the system. The program logic configures the processor to:

obtain an initial colour palette from the electronic rendering, wherein the initial colour palette is an ordered list of a plurality of printing inks, each of the plurality of printing inks in the initial colour palette corresponding to a respective one of the plurality of unique colour values in the electronic rendering of the user-selected artwork, and extract a final colour palette from the initial colour palette by clustering the plurality of unique colour values corresponding to the plurality of printing inks in the initial colour palette into discrete colour clusters, wherein the resulting number of discrete colour clusters is less than the plurality of unique colour values, finding a centroid for each discrete colour cluster formed by clustering, creating a reduced colour set containing a plurality of colour values within the particularly-defined colour space, each colour value in the reduced colour set corresponding to the colour value for each centroid found, and ordering the plurality of colour values in the reduced colour set to form the final colour palette as an ordered list of a plurality of printing inks.

The program logic may further configure the processor to extract the final colour palette by setting a desired size (i.e. integer, N) for the final palette and upon determining that the reduced colour set contains more colour values than the desired size (a) randomly selecting N colour values from the reduced colour set to be initial cluster centroids within the colour space, (b) assigning each remaining colour value in the reduced colour set to a colour cluster having the nearest initial cluster centroid within the colour space, and (c) for each of the initial cluster centroids, recalculating the colour value of the initial cluster centroid based on all of the colour values assigned to that colour cluster resulting in a recalculated initial cluster centroid for each colour cluster. The program logic may then configure the processor to set a change index, R, to zero and for each colour value in the reduced colour set find the recalculated initial cluster centroid that is the closest and if the colour value is not already assigned to the closest colour cluster, recalculate initial cluster centroid, reassign the colour value to the closest colour cluster, and incrementing the change index, R. The program logic would configure the processor to output the recalculated initial cluster centroids as the final colour palette if the change index remained zero (e.g. no changes). However, if the change index was greater than zero, then a colour value had to be reassigned to a new colour cluster, so the program logic recalculates the colour value of each recalculated initial cluster centroid based on the colour values currently assigned to the colour cluster, and then retests whether each colour value has been assigned to the correct colour cluster by resetting the change index to zero, and for each colour value in the reduced colour set find the cluster centroid that is the closest and if the colour value was not already assigned to the closest colour cluster, recalculate the colour cluster, reassigned the colour value to the closest colour cluster, and increment the change index.

These and other aspects of the disclosure will be further explained below.

BRIEF DESCRIPTION OF THE DRAWINGS

For a better understanding of the present disclosure, non-limiting and non-exhaustive embodiments are described in reference to the following drawings. In the drawings, like reference numerals refer to like parts through all the various figures unless otherwise specified.

FIGS. 7, 8 and 9 of the drawings together illustrate prior art colour separation printing of an image using two colours.

DISCLOSURE OF EMBODIMENTS

Figure 1:
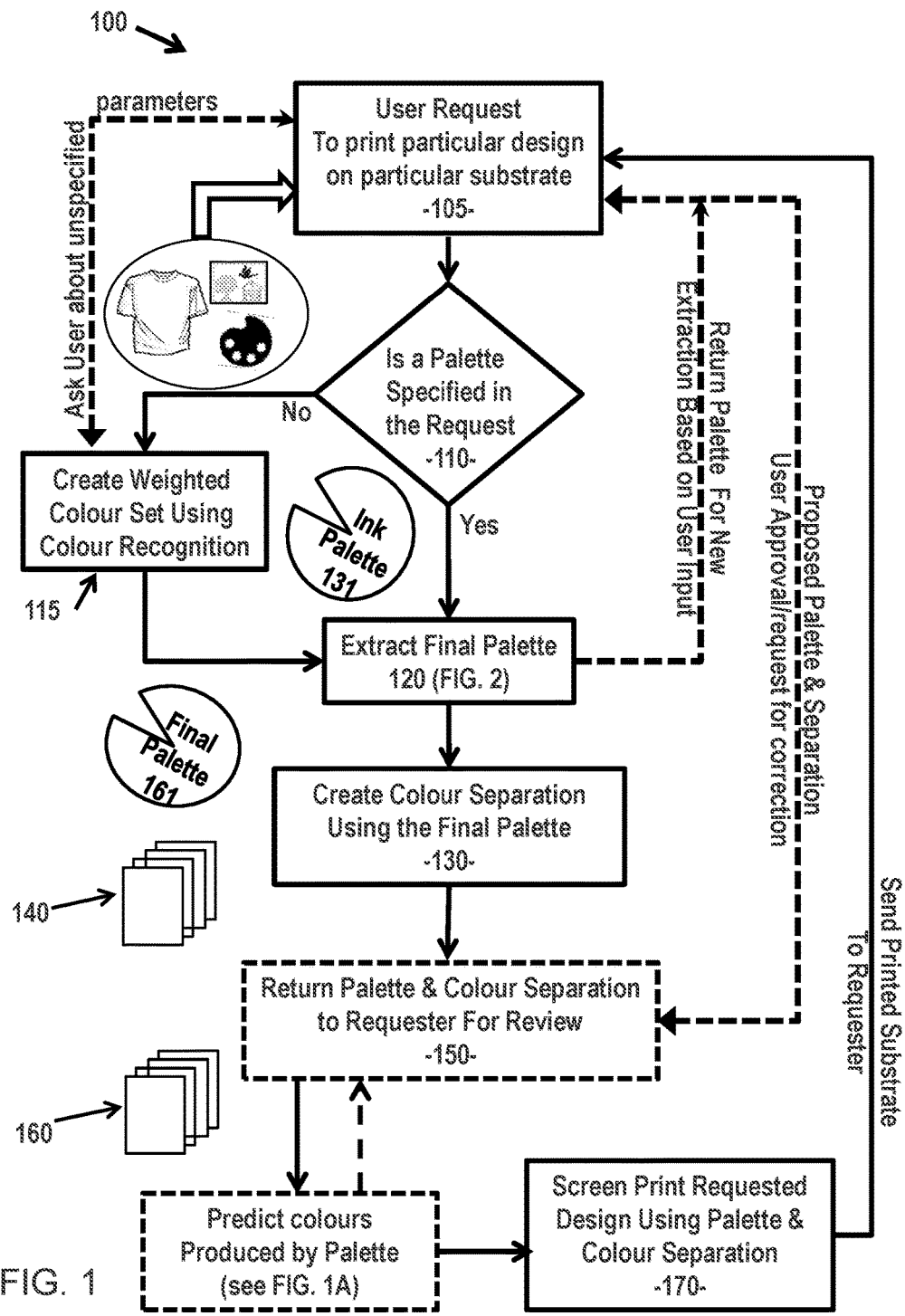
FIG. 1 of the drawings is a flow diagram of one illustration of a general process for creating a colour separation for use in a multi-stage printing process to produce an acceptable facsimile of the colours found in a user-selected, pre-existing design.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. The following detailed description is, therefore, not to be taken in a limiting sense.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAAB-CCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including, but not limited to, each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

As used herein, "components" may be analog or digital components that perform one or more functions. The term "component" may include hardware, such as a processor (e.g., microprocessor), a combination of hardware and software, and/or the like. Software may include one or more computer executable instructions that when executed by one or more components cause the component to perform a specified function. It should be understood that any and all algorithms described herein may be stored on one or more non-transitory memory. Exemplary non-transitory memory may include random access memory, read only memory, flash memory, and/or the like. Such non-transitory memory may be electrically based, optically based, and/or the like.

There is disclosed an automated and cost effective solution for pre-press colour separation of artworks that may even be submitted over a computer network (described below) to produce resultant printing plate files that are subsequently used sequentially to print a desired design on a desired medium in a printing system. Various types of mediums may be desired such as fabric, ceramic, glass, vinyl, plastic, metal, and paper, for example. And, for instance, with respect to fabric media there are different types of fabric (e.g. cotton and wool), weights, weaves, and finishes. A breadth of alternatives also exists with respect to paper. In fact, there are variations in most of the materials that may be desirable to print on. Most media is also available in a variety of colours, including, but not limited to, black, green, red, yellow, blue, and white.

Not only are there a variety of media that may be printed upon there is also a wide variety of inks to do the printing. The type of ink used will provide a different appearance to the final printed product. For example, there are water-based inks, Plastisol inks, process inks, low-bleed inks, and neon ink, among other ink types. These inks are made by a variety of manufacturers in a variety of colours. The price for the types and colours of inks varies.

The various systems and methods contemplated by the present disclosure may use CMYK process colour separations. The various systems and methods contemplated by the present disclosure may use simulated process colour separations. These are similar to process colour separations, but instead of CMYK, they use an arbitrary palette. In this paradigm, half-tones of a few ink colours may then be mixed together to represent the colours in the original design.

The quality of reproduction that may be achieved by the presently disclosed methods and systems may be affected by many factors including the appropriateness of the custom palette, type of used ink, type of substrate, separation quality, and the like. The present systems and methods work toward balancing factors including availability and cost of inks; availability and cost of substrates; other costs, speed; reproduction quality; and a goal of limiting operator intervention. In one embodiment, the systems and methods disclosed herein allow for the user selection of parameters (such as the number and nature of the inks to be used to achieve a particularly desired design at a cost the user is willing to bare) from only the artwork itself, which further reduces the needed pre-press processing costs and time.

As used herein the terms "acceptable colour replication," "acceptable facsimile," and the like are intended to signify that the colours that would be ultimately printed using the separation plates are practically indistinguishable by the average consumer from the colours found in the original artwork (e.g. photo).

The various methods disclosed herein for creating colour separations for use in multi-stage printing processes to produce an acceptable facsimile of the colours found in a user-selected, pre-existing design may be implemented by various systems that operate in association with those methods as would be understood by those of ordinary skill in the art after having reviewed these specifications, drawings and the appended claims.

These disclosed systems and methods—among other potential advantages—are expected to reduce the number of times that human intervention is required to achieve acceptable colour replication, which reduces the labor cost, time, and error rates. Full automation would allow embodiments of the present methods and systems to live on a server, such as backend server 660 (discussed below), so many users (e.g. clients/customers) can invoke the disclosed solutions through applications (i.e. program logic), APIs, or the like, for example, which may be hosted on a web server 640 and/or downloaded to one or more user devices 610 for local operation.

FIG. 1 of the drawings provides a flow diagram to illustrate one set of potential embodiments of a basic illustrative process 100 for creating a colour separation for use in a multi-stage printing process to produce an acceptable facsimile of the colours found in a user-selected, pre-existing design. It should be understood by those of ordinary skill in the art having reviewed the present specification, drawings, and the appended claims that this particular process 100 provides one basic illustrative process along with various options that may or may not be used in associated with the basic illustrative process 100. As will be discussed below, process 100 may be implemented by one or more aspects of system 600 (FIG. 6), alone or in conjunction with one another, as would be understood by those of ordinary skill in the art.

As illustrated in FIG. 1 at element 105, the process 100 electronically receives a user-generated request to print a particular pre-existing design (i.e. electronic artwork) on a particular substrate. Optionally, the request may specify additional parameters to be considered in arriving at the determined colour separation. Those parameters may include the desired ink palette for printing. Those parameters may further include, for instance, the types of screens to be used for each individual ink in the palette. As illustrated at a high level of generality in FIG. 1B, the processes may be associated with a graphical user interface that may be rendered (on an output device) to help the user review and input (via an input device) the parameters desired, such as selection of substrate, pre-existing design or artwork, and various design parameters that the user may choose to modify (or not). Where a user fails or otherwise chooses not to provide this information, the process 100 may send a request to the user about unspecified parameters. Similarly, if the user requests an ink or screen type that may be unavailable or undesirable (generally or just within the scope of the project) the process may notify the user of the concern and wait to receive further user input. This input may include active and passive options to ignore the information provided by the system. Of course, in the instances where a particular ink or inks and/or screen is unavailable, the process will not complete.

The most important parameter to establish in the present methods and systems is the palette to be used in association with the multi-stage printing process. A palette is an ordered list of inks. Each ink is specified by one or more discrete values. These discrete values may be based on a standard industry descriptor, an RGB triplet, CYMK quartet, and the like. FIG. 1C illustrates one example palette using a CYMK quartet. The ordering of the palette is determined to better optimize the appearance of the artwork, the cost of printing, and/or a combination of both (and perhaps even other factors). The resulting ordered list of colour-amount pairs generally predicts the result of screen-printing the given colours in the given amounts in the given-order on a particular substrate (e.g. fabric).

In element 110, the process 100 determines whether there was an ink palette specified by the user in the received request. If there was an ink palette provided then, the process continues to element 130. If no ink palette was provided by the user, then process 100 moves to element 115 wherein an ink palette 131 is created from the pre-existing design using colour recognition techniques.

As shown in FIG. 1, the process of extracting a final palette may involve sending inquiries to the user about various parameters, including, but not limited to available inks and potential ink palettes. All of the parameters required for colour separation that weren't specified in the user generated request may be determined by another method based upon one or more of the known parameters, including—in particular—the artwork to be separated. It is also contemplated that the solution may be capable of posing interactive queries to the end user that generated the initial request toward establishing the value of the other parameters.

Once the process 100 has a proposed ink palette 131 operably and substantively associated with the user request and any other desirable parameters have been determined, the process 100 continues to element 120 where the final palette 161 is extracted. The process of extracting the final palette is illustrated and described in association with FIG. 2 of the drawings.

Once the final palette 161 has been extracted, the process 100 continues to element 130 wherein a colour separation is created of the artwork using the proposed palette 131 (and any other parameters) to create one or more proposed separation plates 140. The process of creating this colour separation will be discussed shortly below. Focusing for the moment on the main process 100, the proposed palette 131 and proposed separation plates 140 may be returned to the user for user input (i.e. manual feedback on whether or not the resulting separation is personally acceptable to the requesting user).

If one or more of the proposed separation plates 140 are unacceptable, the user may vary inputs manually (in, e.g., element 105 of process 100) or by automatically extracting a new palette (in, e.g., element 120 of process 100), which may be associated with new parameters input by the user. Once the user accepts that proposed palette 131 and proposed separation plates 140, the final separation plates 160 and final palette 161 are sent to the printing system 690 for screen printing in element 170 of process 100.

From the separation plates constituting the colour separation, create a single file in some format standard in the printing industry, for instance EPS (Encapsulated PostScript (Adobe Systems)). Annotate the plates in the file with their respective parameters (e.g. ink name). Send the file for screen printing. It is also contemplated that the separation plates and their parameters may be saved for future use and may or may not be associated.

Figure 1A:
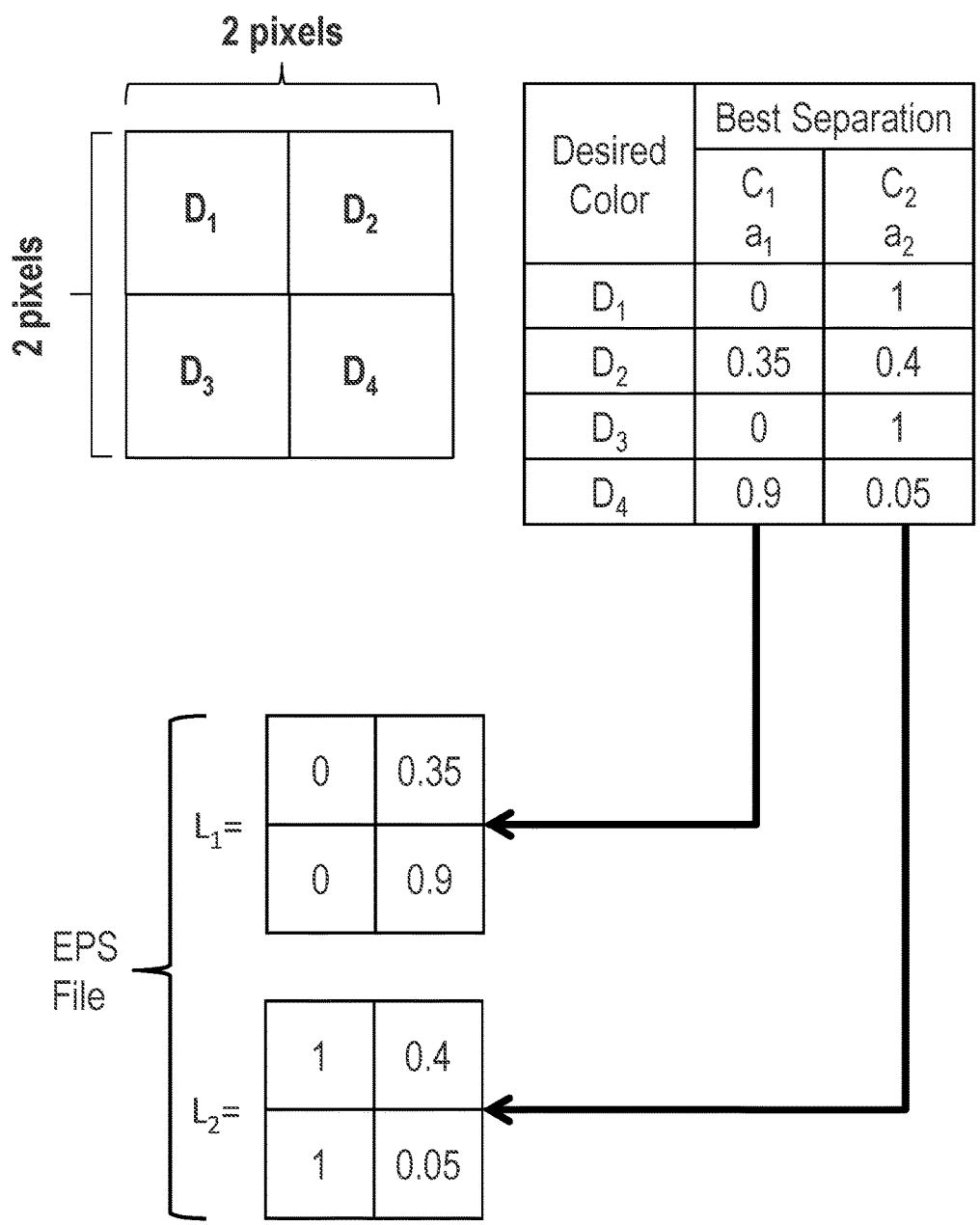
FIG. 1A of the drawings is an illustration of the operation of a printed colour mixing simulator operation on a 2×2 pixel grid.
Figure 1B:
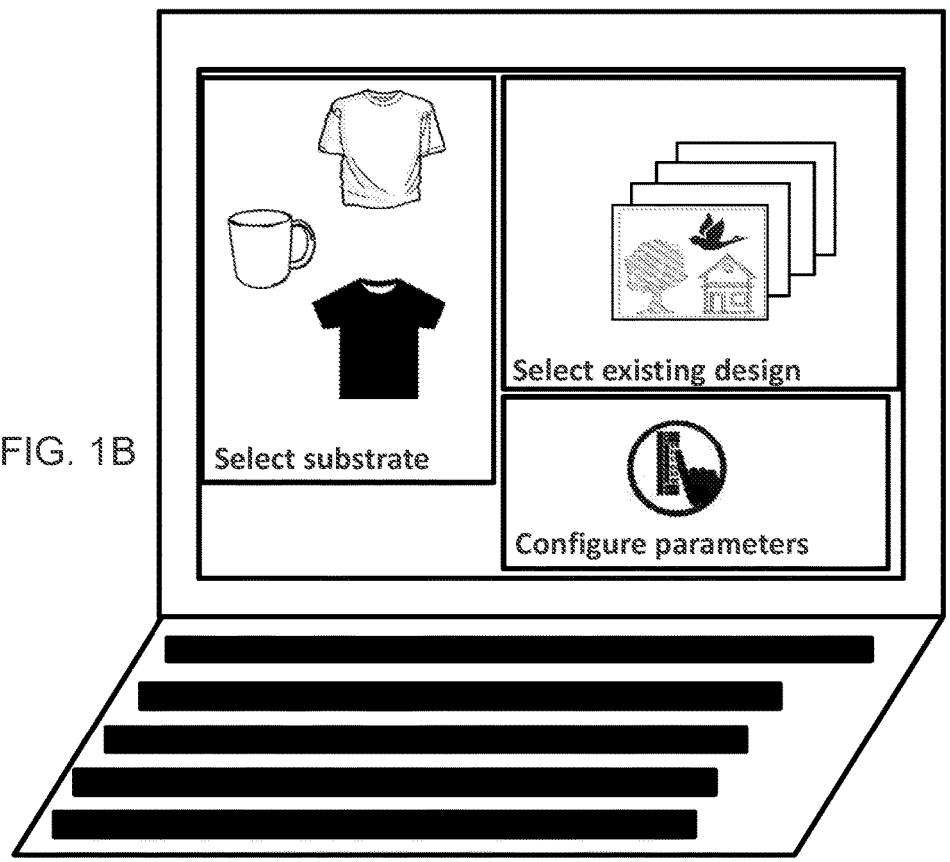
FIG. 1B of the drawings is a high level illustration of one potential user graphical interface depicting the ability for user selection of substrate, existing design, and modification of design parameters.
Figure 1C:
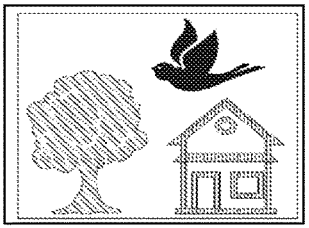
FIG. 1C of the drawings is an illustration of one potential user interface depicting the user selection of a particular existing design, which is illustrated as having a preexisting CMYK palette already prepared for use in faithfully reproducing the design.

Printed Colour Mixing Simulator (FIG. 1A)

In order to substantially ensure good separation of a colour into a proposed or final palette (131 or 161, respectively), it would be further desirable to have the ability to predict what colour would be produced by printing a given combination of proposed palette 131/proposed separation plates 140 and/or the final separation plates 160/final palette 161. This may be done by simulating the behavior of the colour mixing based on the proposed palette 131 or the final palette 161. As previously noted, each of these palettes is an ordered list of inks, each ink being specified by one or more discrete values (e.g. RGB triplet, CMYK quartet) with the ordering of the inks in the palette determining the order in which the inks are sequentially applied to the substrate in a multi-stage printing process.

The colour mixing simulator process may preferably be applied to every pixel of the colour separation to predict the final appearance of the artwork/design that would be ultimately printed using the colour separation and palette to use it as a "printing proof" for determining the quality of the currently anticipated colour separation. This simulated "printing proof" may then be used to provide feedback to improve the quality of the ultimate colour separation by allowing review of the simulated proof to determine whether it be an acceptable colour replication of the original artwork.

The preferred process for colour mixing simulation is described here as using a linear combination to simulate how a set of colours in a specified order interacts to create a final colour. This linear combination may be carried out by a processor associated with system 600. Specifically, for two colours $C_1$ and $C_2$ being mixed with amounts $amount_1$ and $amount_2$, the mixture $M=C_1 \oplus C_2$ is given by:

$$M=C_1 \oplus C_2 = C_1 * amount_1 + C_2 * amount_2$$

where the result C' of multiplying a colour $C=(C_R, C_G, C_B)$ by a scalar $amount_i$ is $$C'=(C'_R, C'_G, C'_B)=(C_R * amount, C_G * amount, C_B * amount)$$

To mix more than one colour, we simply mix the colours iteratively. For example, the mixture of N colours $C_1, \ldots, C_N$ is be expressed by the following formula:

$$( \ldots ((C_1 \oplus C_2) \oplus C_3) \oplus \ldots \oplus C_N)$$

Each of the colour values for the resulting simulated mixed colours may then be mathematically compared to colour values for each of the original pixels in the original user-selected artwork. In some instances, this may require normalizing the colour values into the same particularly defined colour space (e.g. RGB, CMYK). If a simulated colour value doesn't sufficient match the colour value of the original pixel, the system may adjust the values of the set of colours used in developing the simulation to result in a better simulated colour mix. The determination of whether or not colour values sufficiently match one another is a function of the definition of an acceptable facsimile being used by the system.

Figure 2:
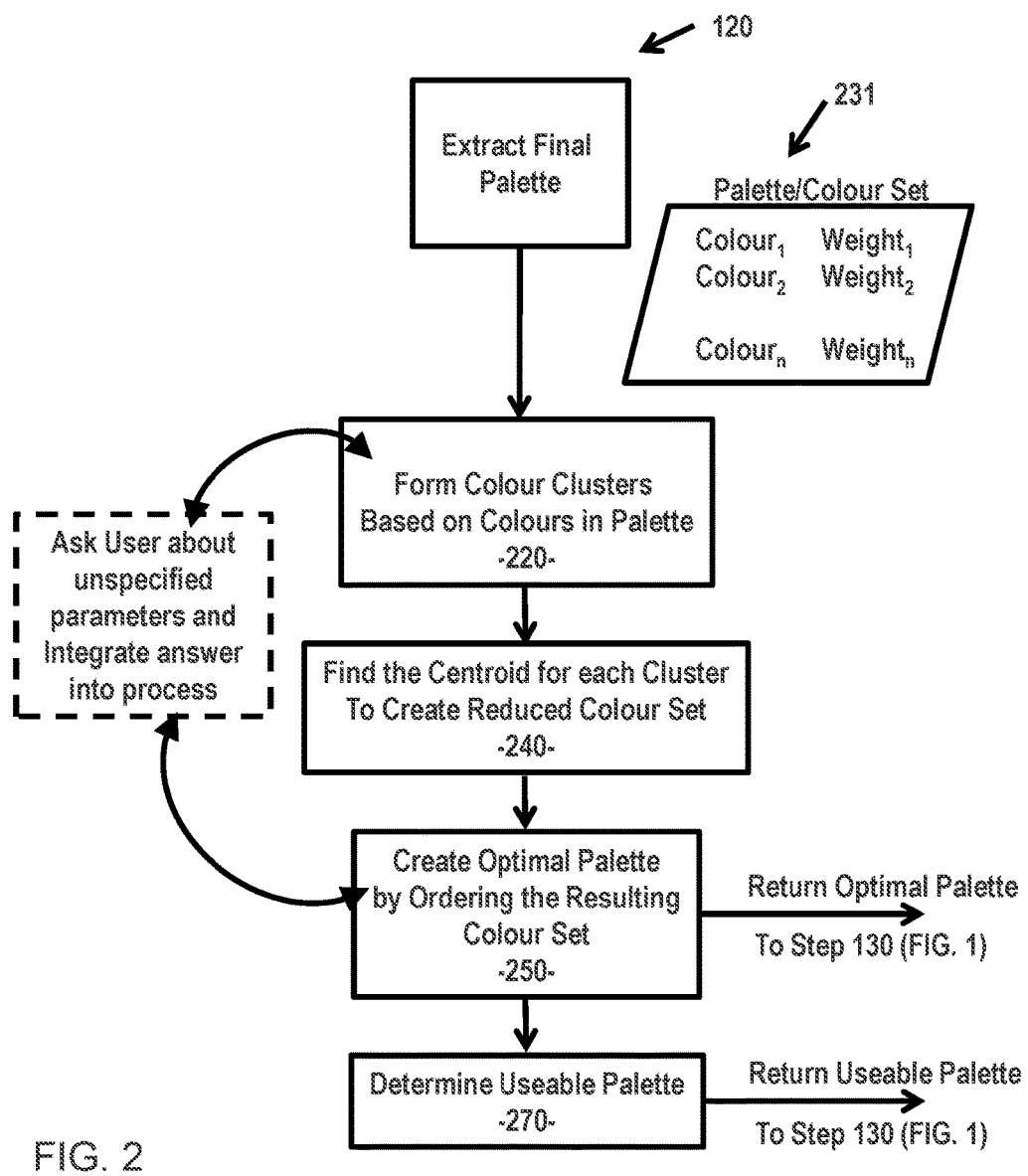
FIG. 2 of the drawings is a flow diagram of the general process for automatically extracting optimal and useable colour palettes from a user-selected image.

Automated Palette Extraction (FIG. 2)

The role of the autonomous colour palette extractor is to extract from a particular selection of artwork a colour palette which is suitable for screen printing a presentation of that particularly selected artwork.

FIG. 2 is a flow diagram illustrating the general process for automatically extracting optimal and useable colour palettes from a user-selected design or piece of artwork. By "optimal" palette we mean the ideal palette of potentially unlimited colours that would faithfully and perfectly reproduce the colours of the original artwork. Except in the rare case of artwork containing nothing other than a few primary colours, it is commercially unrealistic to use an optimal palette in printing. There are certain aspects that are important in selecting an useable palette. In general, the disclosed methods and systems have been described with to calculate a variety palette alternatives toward ultimately trying to select a palette: (a) that has as few colours as possible; (b) where taking out one colour would significantly deteriorate the printing quality; and (c) where changing any of the parameters of the selected colours would lead to a worse colour representation of the artwork when printed. The process 120 begins at elements 205 and 210, by determining whether a set of all of the colours present in the artwork has been provided to the system. This colour set 231 may have been stored in association with the user-selected design/artwork. Where no pre-existing colour set has been provided, the process 120 in element 210 determines a colour set 231 for using colour recognition techniques. Preferably, a weight is assigned to each and every colour in the colour set 231. In the preferred approach, this weight is based simply on how many pixels in the artwork share that particular colour.

Figure 3:
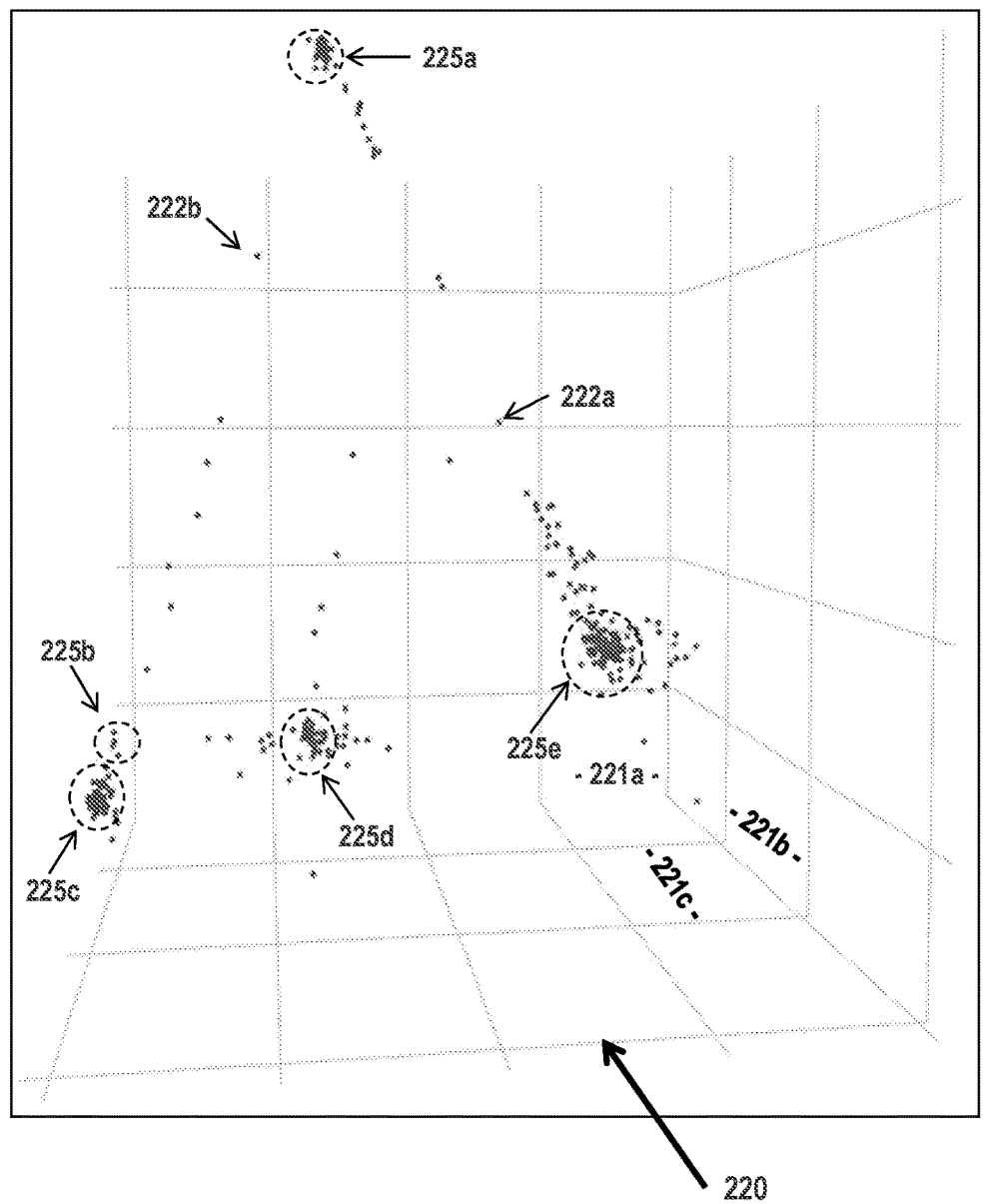
FIG. 3 of the drawings is a cluster graph showing the clusters of colours generated for a reduced colour set by one exemplary clustering approach performed on an illustrative user-selected image.

Next, the process 120 seeks to reduce the set of colours in accordance with the first design goal (noted above) for the present palette extraction process. This reduction in the set of colours may be achieved by forming colour clusters based on the colours in colour set 231 generated from the user-selected artwork. FIG. 3 is a cluster graph 220 illustrating the formation of colour clusters generated by a hierarchical agglomerative clustering (HAC) technique using an illustrative colour set and user-selected artwork. In particular, cluster graph 220 has three-axes, 221*a*, 221*b*, and 221*c*. Each point on the cluster graph 220 (e.g. points 222*a* and 222*b*), thus represents a colour in three-dimensional space as defined by the axes of cluster graph 220. Also illustrated on the cluster graph 220 of FIG. 3 are colour clusters 225*a*, 225*b*, 225*c*, 225*d*, and 225*e*. (Nothing about the particular locations, cluster circumferences, and/or number of colour points contained within any of the illustrative clusters 225 in FIG. 3 are intended to convey anything specific about the particular techniques used. They are merely to illustrate some of the nomenclature associated with the formation of colour clusters for sake of explanation.) The HAC technique used to generate cluster graph 220 provided that: (a) each colour be understood to be a vector of values in some colour space (e.g. RGB (three-dimensional), sRGB (three-dimensional), CMYK (four-dimensional)), and (b) each cluster is understood to be a set of unique colours with each colour in a cluster having an assigned weight. In the preferred approach, the assigned weight is based simply on how many pixels in the artwork share that particular colour vector.

The formation of colour clusters from the colour set 231 (i.e. element 220 of FIG. 2) may be performed using any of: (1) hierarchical agglomerative clustering (HAC); (2) k-means clustering; (3) fuzzy C-means clustering; (4) spectral clustering; (5) Ward hierarchical clustering; (6) Expectation-maximization (EM) clustering; (7) BIRCH algorithm clustering; and (8) median cut.

Hierarchical agglomerative clustering (HAC) has several manipulable linkage criteria (or parameters). Those values end up being largely irrelevant in forming colour clusters based on colour set 231, except for the "single-linkage clustering" criteria. "Single-linkage clustering" HAC is generally not successful in the context of process 120 because that particular approach forms colour clusters in such a way that two very perceptually different colours may undesirably end up in the same cluster.

Figure 4:
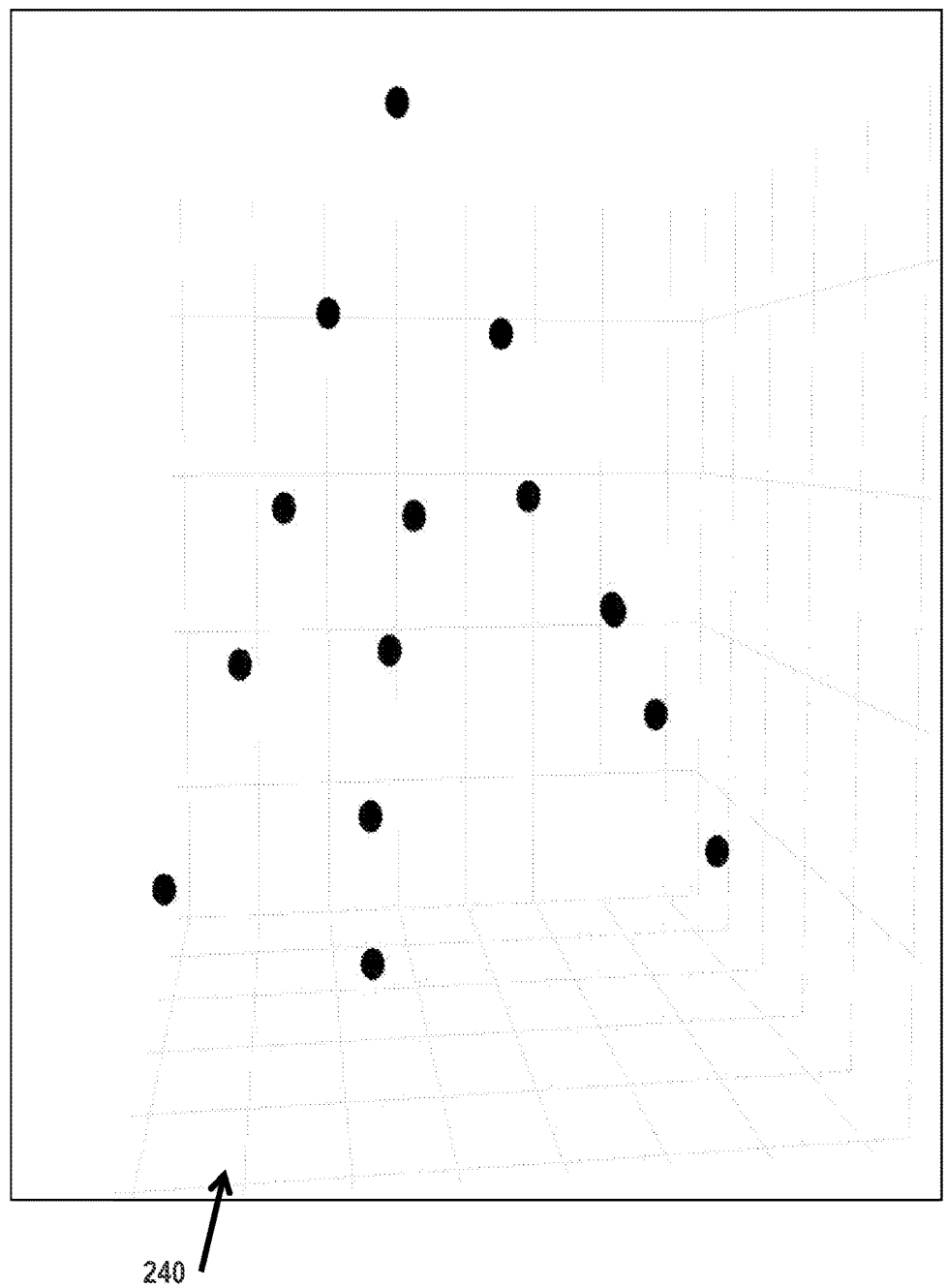
FIG. 4 of the drawings is a cluster graph showing the ascertained centroids of the clusters of colours generated for a reduced colour set using one exemplary centroid approach on the results depicted in FIG. 3 generated by one exemplary clustering approach performed on an illustrative user-selected image.

After the colour clusters are formed, process 120 finds the centroid for each cluster in the result, element 240. The centroid of each cluster is defined as the weighted average of the colours comprising the cluster. FIG. 4 is a graph 240 showing the centroids determined using this approach on the colour cluster graph 120 (depicted in FIG. 3). Because N=14 in our example, graph 240 depicts fourteen centroids, each representing an ink colour. Comparing the number of ink colour points 222 in FIG. 3 with the fourteen centroids in the graph 220 illustrated in FIG. 4, we can see that in this particular example there was an extensive reduction in the number of ink colours in the reduced colour set. The ink colour represented by the centroid may not be available (or its purchase price may be impractically expensive) in which case the process finds at least one available printing ink that has the closest colour to the centroid (the multi-dimensional distance defined in the colour space (e.g. graph 240). Where multiple available inks are equidistant from the centroid, process 120 may automatically select one of the available inks or it may offer a list of available inks for the operator to select from. In one approach, the relative price and availability of the multiple available inks (e.g. in stock, available for immediate delivery, or on backorder) may be used to select the ink used to represent the centroid. For instance, where two equidistant inks are in stock, the process 120 would select the less expensive of the two to represent the centroid.

The reduction to the useable colour palette described above generates an unordered set of colours. For screen printing purposes, the colours need to be ordered. In element 250, the optimal palette is created by ordering the reduced colour set produced by element 240. In one approach, a heuristic-based ordering approach may be used to order the colours (i.e. bright colours first, dark colours last). In other words, the colours are sorted by their brightness, in decreasing order, where brightness is defined (see IEC 61966-2-1: 1999 Multimedia systems and equipment—Colour measurement and management—Part 2-1: Colour management—Default RGB colour space—sRGB) as sRGB relative luminance:

$$\text{brightness} = 0.2126\,R + 0.7152\,G + 0.0722\,B$$

Other approaches to colour ordering may be used based on the relative luma, luminance, or lightness of the colours in the reduced colour set.

Figure 5:
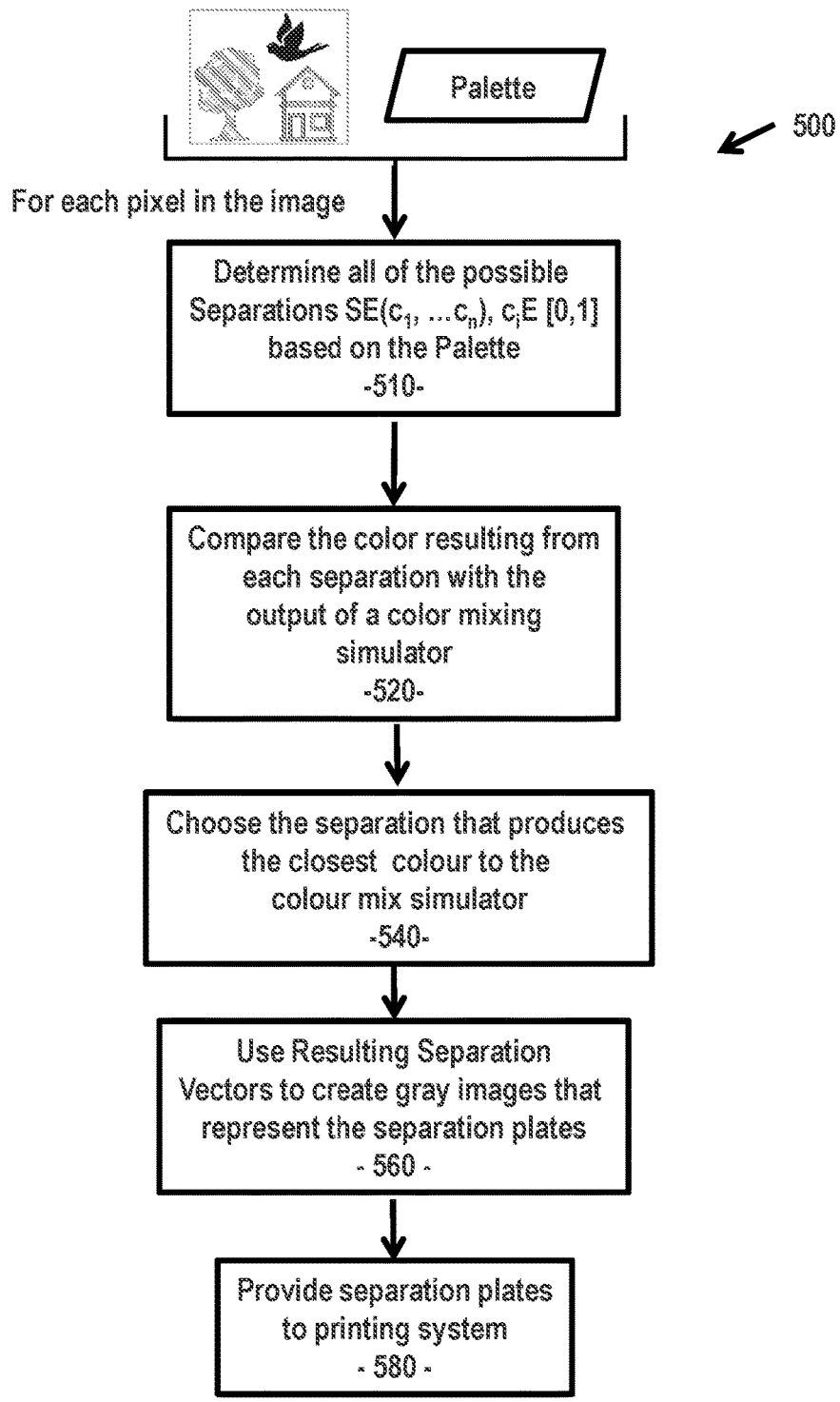
FIG. 5 of the drawings is a flow diagram of the general process for autonomously creating a colour separation for use in printing in a multi-stage printing process to produce an acceptable facsimile of a user-selected image, including the various colours found therein.

Autonomous Colour Separator (FIG. 5)

The methods and systems described above separate a piece of artwork into individual colours in a palette and obtain a list of images defining the intensity of each constituent colour at different locations in the image. These images in the list are called "plates" (or "separation plates"). An overarching goal of pre-printing for multi-stage printing is to separate images as a whole. This means that when the plates are printed, the result will be as faithful a reproduction of the original digital image as possible. Thus, some embodiments of the methods and systems may further include an autonomous colour separator to generate higher quality separations. At a high level, the autonomous colour separator receives the artwork/design as a digital image and the proposed or final colour palette (131 or 161), and then:

1. For each pixel in the digital image, the autonomous colour separator finds the nearest ink colour from amongst the palette colours and an optimum ink amount of the palette colours that produce an acceptable facsimile of the given pixel colour when simulated using the Printed Colour Mixing Simulator (described above).
2. For each colour in the palette, the autonomous colour separator reconstructs the corresponding separation plate from the ink amounts that were computed for each image pixel. In determining the optimum ink amounts, the autonomous colour separator may use any one or more of a wide-variety of known optimization techniques.

FIG. 5 is a flow diagram illustrating the general process of separating a digital image using a specific colour palette into a sequence of separation plates. More particularly, the role of the autonomous colour separator process 500 is to produce from a digital image of the selected artwork and a specified colour palette a set of separation plates that are suitable for screen printing the selected artwork.

In order to separate a raster image (e.g. a composite of RGB), in general we separate the colour of each individual pixel of the digital image. To obtain the separation of a desired pixel colour $D = (D_R, D_G, D_B)$ into a palette of colours $(C_1, \ldots, C_N)$ and their respective amounts $(a_1, \ldots, a_N)$, we first choose a fixed number of quantization bins Q. We then generate all combinations of quantized amounts, that is $(a_1, \ldots, a_n) = (1/Q)^*(b_1, \ldots, b_2)$, for all combinations of $b_i$ in $0, \ldots, Q$. The generated amount combinations $(a_1, \ldots, a_n)$ are then provided as input to the mixing simulator, as described above, resulting in a candidate desired pixel colour $D_j$. The candidate desired pixel colour $D_j = (D_{j,R}, D_{j,G}, D_{j,B})$ that has the smallest distance $d_j$ from the desired pixel colour D, given as $$d_j = |D_R - D_{j,R}| + |D_G - D_{j,G}| + |D_B - D_{j,B}|$$

is chosen as the result and its constituting amounts $a_i$ are output into the corresponding positions on the individual output layers $L_i$. An illustration of this process for a 2×2 pixel image can be seen in FIG. 1A. As shown in FIG. 1A, the layers $L_1, \ldots, L_N$ are then saved, together with the palette colours $C_1, \ldots, C_2$ they represent and in the order specified by the palette, as an Adobe Illustrator Encapsulated Postscript Vector (EPS) file. The resulting EPS file may be used to in the screen printing process at printing system 690.

The process 500 begins at element 510, by determining all of the possible colour separations based on the provided colour palette. A colour separation is a sequence of N ink amounts, where N is the number of colours in the colour palette. The ink amounts are percentages that correspond to how much of the respective colour inks should be applied in the printing process. The element 510 proceeds as follows:

1. Setting a desired number of levels of ink amounts—an integer Q, where Q is a number between 0 and 98.
2. Determine the ink amount levels based on Q. Amounts of 0% and 100% are always present and Q denotes the number of intermediate levels of amounts, split evenly in the interval 0%-100%. For example, where the intermediate levels are rounded to the nearest integer value:
   a. If Q is 0, the levels are: 0%, 100%
   b. If Q is 1, the levels are: 0%, 50%, 100%
   c. If Q is 2, the levels are: 0%, 33%, 67%, 100%
   d. If Q is 3, the levels are: 0%, 25%, 50%, 75%, 100%
   e. If Q is 41-66 the levels are 0%, 2%, 4%, 6%, 8%, 10% . . . 90%, 92%, 94%, 96%, 98%, and 100%
   f. If Q is 67 or higher, the levels are 0%, 1%, 2%, 3%, 4%, 5%, . . . 95%, 96%, 97%, 98%, 99%, and 100%
3. Combine the potential levels determined in step 2 by Cartesian product for all colour inks in the palette. For example, if the colour palette contains 3 colour inks and Q is 0, the possible combinations are: [0%, 0%, 0%], [0%, 0%, 100%], [0%, 100%, 0%], [100%, 0%, 0%], [0%, 100%, 100%], [100%, 0%, 100%], [100%, 100%, 0%], [100%, 100%, 100%].

The preferred process for colour mixing simulation is described here as using a linear combination to simulate how a set of colours in a specified order interacts to create a final colour. This linear combination may be carried out by a processor associated with system 600 in FIG. 6. Specifically, for two colours $C_1$ and $C_2$ being mixed with amounts $\text{amount}_1$ and $\text{amount}_2$, the mixture $M = C_1 \oplus C_2$ is given by:

$$M = C_1 \oplus C_2 = C_1 * \text{amount}_1 + C_2 * \text{amount}_2$$

where the result C' of multiplying a colour $C = (C_R, C_G, C_B)$ by a scalar $\text{amount}_i$ is $$C' = (C'_R, C'_G, C'_B) = (C_R * \text{amount}, C_G * \text{amount}, C_B * \text{amount})$$

To mix more than one colour, we simply mix the colours iteratively. For example, the mixture of N colours $C_1, \ldots, C_N$ is be expressed by the following formula:

$$(\ldots ((C_1 \oplus C_2) \oplus C_3) \oplus \ldots \oplus C_N)$$

In element 540 of FIG. 5, for every pixel of the image being separated, the system finds the colour from among the colours determined in element 520 having a colour value within the particularly-defined colour space (e.g. RGB) with the smallest distance to that pixel's colour value in the original user-selected artwork (e.g. the value used to generate the colour for that particular pixel of the image on a computer monitor), and associate its corresponding combination of amounts with the pixel. If there are multiple colours equidistant to the pixel's colour the system may choose any of them, arbitrarily or it may chose the least expensive colour, which would be determined by calculating the cost of the combination of the amounts of printing inks determined to be equidistant.

n element 560 of FIG. 5, the system constructs the separation plates by outputting the best amount combinations determined in element 540 into the corresponding positions on the individual output plates Li. An illustration of this process for a 2×2 pixel image can be seen in FIG. 1A. As shown in FIG. 1A, the layers L1, . . . , LN are then saved, together with the palette colours C1, . . . , C2 they represent and in the order specified by the palette, as an Encapsulated Postscript (EPS) file. The resulting EPS file could then be used to in the screen printing process at printing system 690 (see element 580, FIG. 5).

So these specifications, drawings, and the claims appended thereto, can be summed up as being directed in some large part to a method of colour separating an artwork for mostly autonomous printing of screen printed merchandise that may include one or more of the following elements: obtaining a request associated with screen printing an image onto a substrate of a product; extracting all the required colour parameters from the artwork; performing automated colour separation based on the extracted or supplied parameters; and using the resulting separation file to print on the product. The approach may also include finding the ink colours to be used for the colour separation. This may be done by choosing a subset of the artwork colours that provides, via mixing simulation, a suitable colour gamut and print quality with respect to the artwork. This separation may also be based upon an optimum mixture of the ink colours for achieving the target pixel colour based on a colour mixing simulation.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Aspects of the methods and systems described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

Aspects of the methods and systems disclosed herein may be embodied and/or executed the logic of the processes described herein. Logic may also be embodied in the form of software instructions and/or firmware that may be executed on any appropriate hardware. For example, logic embodied in the form of software instructions and/or firmware may be executed on a dedicated system or systems, on a personal computer system, on a distributed processing computer system, and/or the like. In some embodiments, logic may be implemented in a stand-alone environment operating on a single computer system and/or logic may be implemented in a networked environment such as a distributed system using multiple computers and/or processors, for example.

Figure 6:
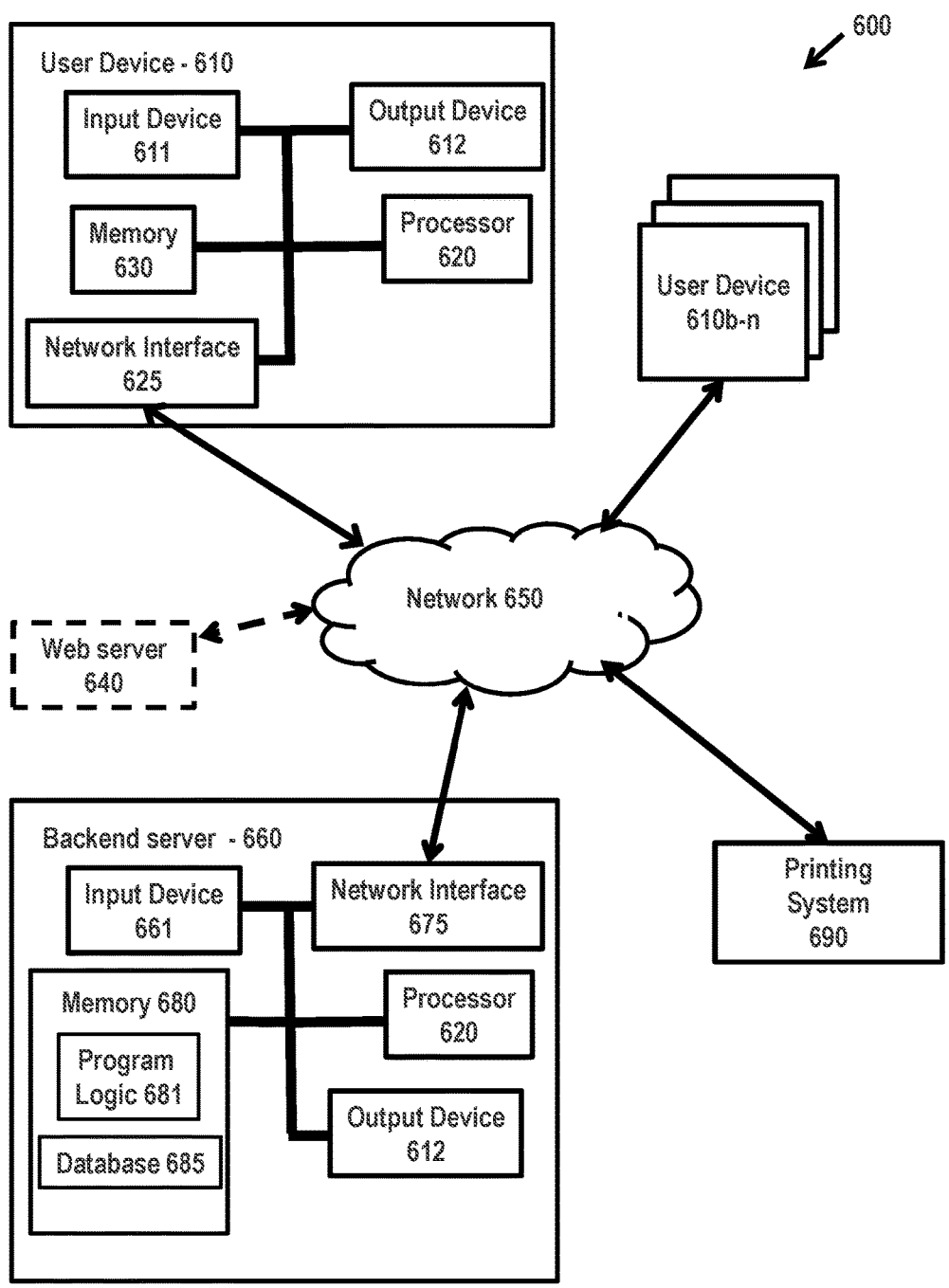
FIG. 6 of the drawings is a block diagram illustration one potential system within which one or more of the inventive concepts disclosed in the present specification may be implemented.

Aspects of the methods and systems described herein may also be implemented on an illustrative system 600, depicted in association with FIG. 6. In particular, system 600 may comprise a user device 610, web server 640, backend server 660, network 650, and printing system 690.

The user device 610 of the system 600 may include various components including, but not limited to, one or more input devices 611, one or more output devices 612, one or more processors 620, a network interface device 625 capable of interfacing with the network 650, one or more non-transitory memory 630 storing processor executable code and/or software application(s), for example including, a web browser capable of accessing a website and/or communicating information and/or data over the network, and/or the like. The memory 630 may also store an application 631 that, when executed by the processor 620 causes the user device 610 to automatically and without user intervention provide the functionality of the various systems and methods described the present specification, as would be understood by those of ordinary skill in the art having the present specification, drawings, and claims before them.

The input device 611 may be capable of receiving information input from the user and/or processor 620, and transmitting such information to other components of the user device 610 and/or the network 650. The input device 611 may include, but are not limited to, implementation as a keyboard, touchscreen, mouse, trackball, microphone, remote control, and combinations thereof, for example.

The output device 612 may be capable of outputting information in a form perceivable by the user and/or processor 620. For example, implementations of the output device 612 may include, but are not limited to, a computer monitor, a screen, a touchscreen, an audio speaker, a website, and combinations thereof, for example. It is to be understood that in some exemplary embodiments, the input device 611 and the output device 612 may be implemented as a single device, such as, for example, a computer touchscreen. It is to be further understood that as used herein the term "user" is not limited to a human being, and may comprise, a computer, a server, a website, a processor, a network interface, a user terminal, and combinations thereof, for example.

The backend server 660 of the system 600 may include various components including, but not limited to, one or more input devices 661, one or more output devices 662, one or more processors 670, a network interface device 675 capable of interfacing with the network 650, and one or more non-transitory memory 680 storing data structures/tables (including those of database 685) that may be used by the system 600 and particularly backend system 660 to perform the functions and procedures set forth herein. The memory 680 may also store an application/program store 681 that, when executed by the processor 670 causes the backend server 660 to provide the functionality of the systems and methods disclosed in the present application.

As shown in FIG. 6, the backend system 660 may include a single processor or multiple processors working together or independently to execute the program logic 681 stored on the memory 680 as described herein. It is to be understood, that in certain embodiments using more than one processor 670, the processors 670 may be located remotely from one another, located in the same location, or comprising a unitary multi-core processor. The processors 670 may be capable of reading and/or executing processor executable code and/or capable of creating, manipulating, retrieving, altering, and/or storing data structures and data tables (including those of database 685) into the memory 680.

Exemplary embodiments of the processor 670 may be include, but are not limited to, a digital signal processor (DSP), a central processing unit (CPU), a field programmable gate array (FPGA), a microprocessor, a multi-core processor, combinations, thereof, and/or the like, for example. The processor 670 may be capable of communicating with the memory 680 via a path (e.g., data bus). The processor 670 may be capable of communicating with the input device 661 and/or the output device 662.

The input device 661 of the backend system 660 may be capable of receiving information input from the user and/or processor 670, and transmitting such information to other components of the backend system 660 and/or the network 650. The input device 661 may include, but are not limited to, implementation as a keyboard, touchscreen, mouse, trackball, microphone, remote control, and/or the like and combinations thereof, for example. The input device 661 may be located in the same physical location as the processor 670, or located remotely and/or partially or completely network-based.

The output device 662 of the backend system 660 may be capable of outputting information in a form perceivable by the user and/or processor 670. For example, implementations of the output device 662 may include, but are not limited to, a computer monitor, a screen, a touchscreen, an audio speaker, a website, a computer, and/or the like and combinations thereof, for example. The output device 662 may be located with the processor 670, or located remotely and/or partially or completely network-based.

The memory 680 stores applications or program logic 681 as well as data structures (including those of database 685) that may be used by the system 600 and particularly backend system 660. The memory 680 may be implemented as a conventional non-transitory memory, such as for example, random access memory (RAM), CD-ROM, a hard drive, a solid state drive, a flash drive, a memory card, a DVD-ROM, a disk, an optical drive, combinations thereof, and/or the like, for example. In some embodiments, the memory 680 may be located in the same physical location as the backend system 660, and/or one or more memory 680 may be located remotely from the backend system 660. For example, the memory 680 may be located remotely from the backend system 660 and communicate with the processor 670 via the network 650. Additionally, when more than one memory 680 is used, a first memory 680a may be located in the same physical location as the processor 670, and additional memory 680n may be located in a location physically remote from the processor 670. Additionally, the memory 680 may be implemented as a "cloud" non-transitory computer readable storage memory (i.e., one or more memory 680 may be partially or completely based on or accessed using the network 650).

Each element of the backend system 660 may be partially or completely network-based or cloud-based, and may or may not be located in a single physical location. As used herein, the terms "network-based," "cloud-based," and any variations thereof, are intended to include the provision of configurable computational resources on demand via interfacing with a computer and/or computer network, with software and/or data at least partially located on a computer and/or computer network. In other words, the backend system 660 may or may not be located in single physical location. Additionally, multiple backend systems 660 may or may not necessarily be located in a single physical location.

As illustrated in FIG. 6, the backend system 660 may be provided with one or more databases 685, applications/program logic 681, and one or more processors 670. The program logic 681 and the database 685 (which may comprise one or more data structures and/or data tables) are stored on non-transitory computer readable storage memory 680 accessible by the processor 670 of the backend system 660. It should be noted that as used herein, program logic 681 is another term for instructions which can be executed by the processor 620 or the processor 670. The database 685 can be a relational database or a non-relational database. Examples of such databases include, but are not limited to: DB2®, Microsoft® Access, Microsoft® SQL Server, Oracle®, mySQL, PostgreSQL, MongoDB, Apache Cassandra, and the like. It should be understood that these examples have been provided for the purposes of illustration only and should not be construed as limiting the presently disclosed inventive concepts. The database 685 can be centralized or distributed across multiple systems.

For example, one of the data structures/data tables may include for each project user identification, a link (e.g. URL) to each of the one or more images associated with the project, the palette (i.e. an ordered list of qualified ink identifiers (e.g. names, catalog identification numbers)) associated with the project, and links (e.g. URLs) to the resulting two or more separation files.

The backend system 660 may be capable of interfacing and/or communicating with the user device 610 and/or the printing system 690 via the network 650. For example, the user device 610, backend system 660 and printing system 690 may each be configured to interface by exchanging signals (e.g., analog, digital, optical, and/or the like) via one or more ports (e.g., physical ports or virtual ports) using a network protocol, for example. Additionally, each backend system 660 may be configured to interface and/or communicate with other backend systems 660 directly and/or via the network 650, such as by exchanging signals (e.g., analog, digital, optical, and/or the like) via one or more ports.

The network 650 may be almost any type of electronic network formed from various components as would be understood by those of ordinary skill in the art. For example, in some embodiments, the network 650 may be a version of an Internet network (e.g., exist in a TCP/IP-based network). The network 650 may interface with the user device 610, the web server 640, the backend system 660, and/or the printing system 690 in a variety of ways. In some embodiments, for example, the network 650 may interface by optical and/or electronic interfaces, and/or may use a plurality of network topographies and/or protocols including, but not limited to, Ethernet, TCP/IP, circuit switched path, combinations thereof, and/or the like. For example, in some embodiments, the network 650 may be implemented as the World Wide Web (or Internet), a local area network (LAN), a wide area network (WAN), a metropolitan network, a 3G network, a 4G network, a 5G network, a satellite network, a radio network, an optical network, a cable network, a public switch telephone network, an Ethernet network, and combinations thereof, for example. Additionally, the network 650 may use a variety of network protocols to permit bi-directional interface and/or communication of data and/or information between the backend system 660, the user device 610 and/or the printing system 690. On an interconnected set of LANs, including those based on differing architectures and protocols, a router may act as a link between LANs, enabling messages to be sent from one to another. In addition, communication links within LANs may include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network 650 may utilize any communication method that allows information to travel between the user device 610, the backend system 660, and the printing system 690 for the purpose of practicing the various aspects of the methods and systems disclosed herein.

In one embodiment, a web server 640 may be included in the system 600. The web server may include various components including, but not limited to, one or more input devices, one or more output devices, one or more processors, a network interface device capable of interfacing with the network 650, and one or more non-transitory memory storing program logic that may be used within the systems and methods disclosed in the present specification to perform the functions and procedures described herein. In particular, the web server 640 would preferably provide a cloud- or network-based version of at least the user interface components of the systems and methods disclosed.

While particular embodiments of the present invention have been shown and described, it should be noted that changes and modifications may be made without departing from the presently disclosed inventive concepts in its broader aspects and, therefore, the aim in the appended claims is to cover all such changes and modifications as fall within the true spirit and scope of this invention.

What is claimed is:

1. A method of efficiently creating colour separations for subsequent use in multi-stage printing processes to produce an acceptable facsimile of user-selected artwork on a substrate, wherein each pixel of the user-selected artwork has a pixel colour value, the method comprising:

receiving, on a processor, an electronic rendering of the user-selected artwork, the electronic rendering having a plurality of pixels wherein each of the plurality of pixels has a colour value within a particularly-defined colour space, the electronic rendering containing a plurality of unique colour values;

obtaining an initial colour palette from the electronic rendering using the processor, wherein the initial colour palette is an ordered list of a plurality of printing inks, each of the plurality of printing inks in the initial colour palette corresponding to a respective one of the plurality of unique colour values in the electronic rendering of the user-selected artwork;

extracting a final colour palette from the initial colour palette using the processor by clustering the plurality of unique colour values corresponding to the plurality of printing inks in the initial colour palette into discrete colour clusters, wherein the resulting number of discrete colour clusters is less than or equal to the plurality of unique colour values, finding a centroid for each discrete colour cluster formed by clustering, creating a reduced colour set containing a plurality of colour values within the particularly-defined colour space, each colour value in the reduced colour set corresponding to the colour value for each centroid found, and ordering the plurality of colour values in the reduced colour set to form the final colour palette as an ordered list of a plurality of printing inks; and creating digital representations of colour separation plates for each of the plurality of printing inks in the final palette;

wherein clustering the plurality of unique colour values corresponding to the plurality of printing inks in the initial colour palette is implemented using one of the following techniques: (a) non single-linkage, hierarchical agglomerative clustering (HAC); (b) k-means clustering; (c) fuzzy C-means clustering; (d) spectral clustering; (e) Ward hierarchical clustering; (f) Expectation-maximization (EM) clustering; (g) BIRCH algorithm clustering; (h) median cut; and (i) any combinations of the foregoing; and calculating the colour values within the colour space for one or more composite colours by linear combination of the colour values of one or more selected ones of the plurality of printing inks in the final colour palette, weighted by an amount of that respective printing ink expected in a particular composite colour to be formed by the colour separation plates created based upon the final palette.

2. The method according to claim 1 wherein one or more of the calculated composite colours are displayed to a user on an output device to facilitate the user determining whether each of the calculated composite colours are an acceptable facsimile, the method further comprising:

receiving an indication that at least one of the calculated composite colours is unacceptable;

extracting a first alternative final colour palette using the processor with a first different clustering technique; and using the first alternative final colour palette as the final colour palette.

3. The method according to claim 2 further comprising extracting a second alternative final colour palette using a second clustering technique; and receiving an indication from the user whether to use the first or second alternative final colour palette as the final colour palette.

4. The method according to claim 1 wherein only certain of the plurality of printing inks are available for use, finding the centroid for each discrete colour cluster formed by clustering further comprises:
finding colour values within the particularly-defined colour space for each of the available printing inks;
determining, for each discrete colour cluster centroid found, the shortest distance between the colour value of that centroid and the colour values of the available printing inks to find the closest available printing ink, and
resetting the colour value of the centroid to the colour value of the closest available printing ink.

5. The method according to claim 1 further comprising:
(a) comparing one of the calculated composite colours with a respective one of the pixel colour values from the user-selected artwork;
(b) if the comparison doesn't reflect an acceptable facsimile, adjusting one or both of the weighting or the colour value of at least one of the one or more selected ones of the plurality of printing inks included in the linear combination resulting in the one of the calculated composite colours, recalculating the colour value for the one of the calculated composite colours using the adjusted weighting or colour value of the at least one of the one or more selected ones of the plurality of printing inks and repeating (a) and (b), using the recalculated colour value for the one of the calculated composite colours; and
(c) if the comparison reflects an acceptable facsimile, then the weighting and colour values of the one or more selected ones of the plurality of printing inks resulting in the one of the calculated composite colours being favorably compared, are properly in the final palette.

6. The method according to claim 5 further comprising normalizing colour values into the same particularly defined colour space.

7. The method according to claim 1 wherein only certain of the plurality of printing inks are available for use, finding the centroid for each discrete colour cluster formed by clustering further comprises:
finding colour values within the particularly-defined colour space for each of the available printing inks;
determining, for each discrete colour cluster centroid found, the shortest distance between the colour value of that centroid and the colour values of the available printing inks to find the closest available printing ink, and
resetting the colour value of the centroid to the colour value of the closest available printing ink.

8. A system for efficiently creating colour separations for subsequent use in multi-stage printing processes to produce an acceptable facsimile of user-selected artwork on a substrate, the system comprising:
a processor that has received an electronic rendering of the user-selected artwork, the electronic rendering having a plurality of pixels wherein each of the plurality of pixels has a colour value within a particularly-defined colour space, the electronic rendering containing a plurality of unique colour values, the processor being configured to process the electronic rendering in accordance with program logic;
a memory containing the program logic that configures the processor to obtain an initial colour palette from the electronic rendering, wherein the initial colour palette is an ordered list of a plurality of printing inks, each of the plurality of printing inks in the initial colour palette corresponding to a respective one of the plurality of unique colour values in the electronic rendering of the user-selected artwork, and
extract a final colour palette from the initial colour palette by
clustering the plurality of unique colour values corresponding to the plurality of printing inks in the initial colour palette into discrete colour clusters, wherein the resulting number of discrete colour clusters is less than the plurality of unique colour values,
finding a centroid for each discrete colour cluster formed by clustering,
creating a reduced colour set containing a plurality of colour values within the particularly-defined colour space, each colour value in the reduced colour set corresponding to the colour value for each centroid found, and
ordering the plurality of colour values in the reduced colour set to form the final colour palette as an ordered list of a plurality of printing inks;
wherein the program logic further configures the processor to extract the final colour palette by
setting a desired size for the final palette, wherein the desired size is an integer, N;
upon determining that the reduced colour set contains a plurality of colour values greater than N,
(a) randomly selecting N colour values from the reduced colour set to be initial cluster centroids within the colour space,
(b) assigning each remaining colour value in the reduced colour set to a colour cluster having the nearest initial cluster centroid within the colour space,
(c) for each of the initial cluster centroids, recalculating the colour value of the initial cluster centroid based on all of the colour values assigned to that colour cluster resulting in a recalculated initial cluster centroid for each colour cluster,
(d) setting a change index, R, to zero,
(e) for each colour value in the reduced colour set
(e1) finding the recalculated initial cluster centroid that is the closest,
(e2) if the colour value is not already assigned to the closest colour cluster, recalculating initial cluster centroid, reassigning the colour value to the closest colour cluster, and incrementing the change index, R,
(f) upon R=0, outputting the recalculated initial cluster centroids as the final colour palette,
(g) recalculating the colour value of each recalculated initial cluster centroid based on the colour values currently assigned to the colour cluster, and
(h) repeating (d) through (g).

9. A method of efficiently creating colour separations for subsequent use in multi-stage printing processes to produce an acceptable facsimile of user-selected artwork on a substrate, wherein each pixel of the user-selected artwork has a pixel colour value, the method comprising:
receiving, on a processor, an electronic rendering of the user-selected artwork, the electronic rendering having a plurality of pixels wherein each of the plurality of pixels has a colour value within a particularly-defined colour space, the electronic rendering containing a plurality of unique colour values;

obtaining an initial colour palette from the electronic rendering using the processor, wherein the initial colour palette is an ordered list of a plurality of printing inks, each of the plurality of printing inks in the initial colour palette corresponding to a respective one of the plurality of unique colour values in the electronic rendering of the user-selected artwork;

extracting a final colour palette from the initial colour palette using the processor by clustering the plurality of unique colour values corresponding to the plurality of printing inks in the initial colour palette into discrete colour clusters, wherein the resulting number of discrete colour clusters is less than or equal to the plurality of unique colour values, finding a centroid for each discrete colour cluster formed by clustering, creating a reduced colour set containing a plurality of colour values within the particularly-defined colour space, each colour value in the reduced colour set corresponding to the colour value for each centroid found, and ordering the plurality of colour values in the reduced colour set to form the final colour palette as an ordered list of a plurality of printing inks; and creating digital representations of colour separation plates for each of the plurality of printing inks in the final palette;

wherein extracting the final colour palette further comprises:

setting a desired size for the final palette, wherein the desired size is an integer, N;

upon determining that the reduced colour set contains a plurality of colour values greater than N, (a) randomly selecting N colour values from the reduced colour set to be initial cluster centroids within the colour space, (b) assigning each remaining colour value in the reduced colour set to a colour cluster having the nearest initial cluster centroid within the colour space, (c) for each of the initial cluster centroids, recalculating the colour value of the initial cluster centroid based on all of the colour values assigned to that colour cluster resulting in a recalculated initial cluster centroid for each colour cluster, (d) setting a change index, R, to zero, (e) for each colour value in the reduced colour set (e1) finding the recalculated initial cluster centroid that is the closest, (e2) if the colour value is not already assigned to the closest colour cluster, recalculating initial cluster centroid, reassigning the colour value to the closest colour cluster, and incrementing the change index, R, (f) upon R=0, outputting the recalculated initial cluster centroids as the final colour palette, (g) recalculating the colour value of each recalculated initial cluster centroid based on the colour values currently assigned to the colour cluster, and (h) repeating (d) through (g).

* * * * *